US007421010B2

(12) United States Patent
Kikuchi

(10) Patent No.: US 7,421,010 B2
(45) Date of Patent: Sep. 2, 2008

(54) MOBILE COMMUNICATION TERMINAL

(75) Inventor: Tetsuya Kikuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 906 days.

(21) Appl. No.: 10/107,272

(22) Filed: Mar. 26, 2002

(65) Prior Publication Data

US 2003/0043775 A1    Mar. 6, 2003

(30) Foreign Application Priority Data

Aug. 31, 2001 (JP) .............................. 2001-264603

(51) Int. Cl.
*H04B 1/00* (2006.01)
(52) U.S. Cl. ...................... 375/147; 375/150
(58) Field of Classification Search .............. 375/147, 375/148, 149, 150, 151, 152, 153
See application file for complete search history.

(56) References Cited

U.S. PATENT DOCUMENTS

| | | | | |
|---|---|---|---|---|
| 5,692,015 A | * | 11/1997 | Higashi et al. .............. | 375/340 |
| 6,028,852 A | * | 2/2000 | Miya et al. .................. | 370/335 |
| 6,178,194 B1 | * | 1/2001 | Vasic ......................... | 375/136 |
| 6,363,102 B1 | * | 3/2002 | Ling et al. .................. | 375/147 |
| 6,400,700 B1 | | 6/2002 | Miya et al. | |
| 6,414,988 B1 | * | 7/2002 | Ling ........................... | 375/150 |
| 6,611,675 B1 | * | 8/2003 | Salonen et al. ................ | 455/69 |
| 6,775,340 B1 | * | 8/2004 | Arslan et al. ................ | 375/354 |
| 6,912,259 B1 | * | 6/2005 | Tsumura ..................... | 375/354 |
| 2002/0131479 A1 | * | 9/2002 | Butler et al. ................ | 375/147 |
| 2002/0196842 A1 | * | 12/2002 | Onggosanusi et al. ....... | 375/148 |

FOREIGN PATENT DOCUMENTS

| | | |
|---|---|---|
| EP | 0 854 588 | 7/1998 |
| EP | 1028541 | 8/2000 |
| EP | 1 065 800 A1 | 1/2001 |
| EP | 1065800 * | 1/2001 |
| JP | 09-252266 | 9/1997 |

OTHER PUBLICATIONS

European Search Report dated Jul. 30, 2004.

(Continued)

*Primary Examiner*—Chieh M. Fan
*Assistant Examiner*—Jason M. Perilla
(74) *Attorney, Agent, or Firm*—Katten Muchin Rosenman LLP

(57) ABSTRACT

The invention provides a mobile communication terminal which uses both an extrapolation pilot signal and an interpolation pilot signal to assure a high precision in channel estimation and a high synchronous detection capacity without using TPC control or the like. The apparatus includes a first pilot signal despreading section for despreading a first pilot signal spread with a spread code different from a spread code of a communication channel, a second pilot signal despreading section for despreading a second pilot signal inserted in a data signal and spread with a spread code same as the spread code for the data signal, first and second complex calculation sections, and a correction amount output section for outputting a phase correction amount for phase correction using the results from the first and second complex calculation sections. The apparatus can be applied to a mobile communication terminal of, for example, the CDMA communication method.

23 Claims, 8 Drawing Sheets

OTHER PUBLICATIONS

Masafumi Usuda et al. Optimizing the number of Dedicated Pilot Symbols for Forward Link in W-CDMA Systems IEEE Spring 2000 pp. 2118-2122.

Higashi, et al. "Performance of Coherent Detection and Rake for DS-CDMA Uplink Channels" Personal, Indoor and Mobile Radio Communications pp. 436-440: 1995 IEEE; XP010150924.

Corazza, et al. "DS-CDMA Coherent Uplink for Mobile Satellite Communications" Spread Spectrum Techniques and Applications, Sep. 1998 pp. 719-723.

Jongray, "Error Performance Analysis of Data Based Fast Channel Estimation for CDMA Uplink With Staggered Burst Pilot" Vehicular Technology Conference, 1997: XP010229184 pp. 2177-2178.

European Search Report dated Nov. 27, 2002, for corresponding European Application No. EP 02 25 1943.

* cited by examiner

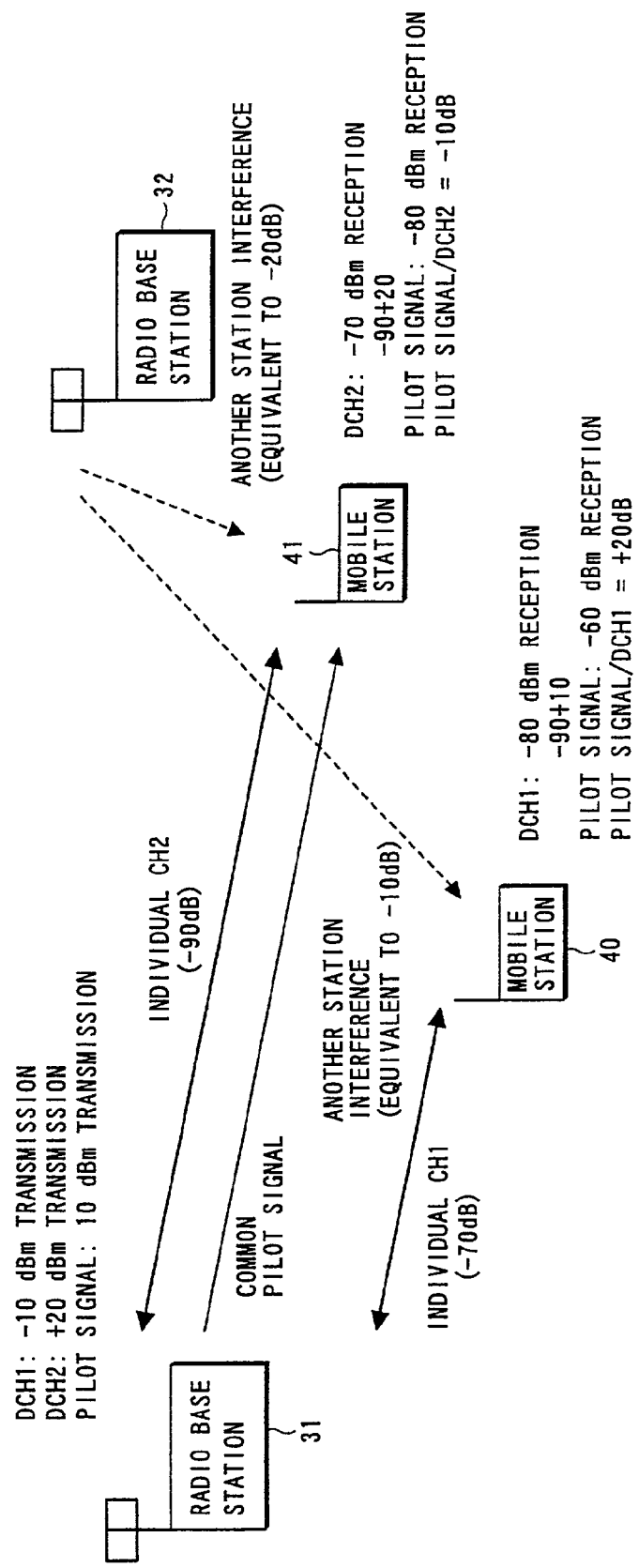

KNOWN PATTERN POLAR
COORDINATE REPRESENTATION

COLLECTED TO FIRST QUADRANT

PHASE ERROR

DETERIORATION OF CHARACTERISTIC
BY INTERFERENCE

1. A PORTION DISPLACED FROM
   THE FIRST QUADRANT MAKES
   AN ERROR.
2. SIR = DESIRED WAVE INTENSITY/
   INTERFERENCE WAVE INTENSITY

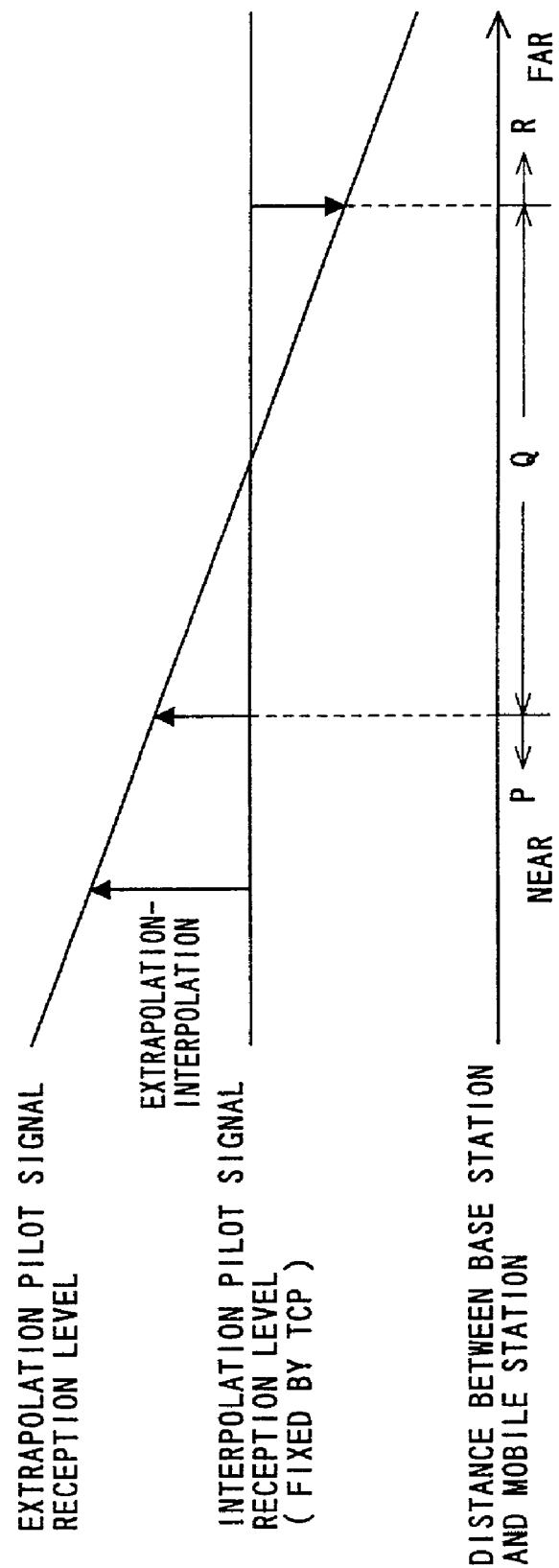

MOBILE COMMUNICATION TERMINAL

BACKGROUND OF THE INVENTION

1) Field of the Invention

This invention relates to a mobile communication terminal, and more particularly to a mobile communication terminal which adopts the CDMA (Code Division Multiple Access) communication system and uses two different systems of pilot signals to achieve improvement of the channel estimation precision.

2) Description of the Related Art

In a mobile communication system which adopts the CDMA communication system, taking it into consideration that the system capacity is increasing, it is essentially necessary to suppress the increase of the total transmission level from a radio base station. Therefore, synchronous detection which is superior in reception characteristic is adopted, and a radio base station transmits a pilot signal (known signal).

The pilot signal transmitted from the radio base station is received by a mobile communication terminal. The mobile communication terminal estimates (channel estimation) the phase rotation amount by which the received signal is to be corrected with the pilot signal and performs phase correction of the received signal to realize synchronous detection. As the pilot signal used here, usually an individual communication channel allocated to each mobile communication terminal and an interpolation pilot signal spread with the same code are available.

By the way, in recent years, a new technique is examined. According to the technique, a radio base station transmits, in addition to such an interpolation pilot signal as described above, an extrapolation pilot signal in which a fixed data pattern (for example, of all "0s") is spread with a code different from that of a communication channel (but having the same frequency) using a channel common to different mobile communication terminals whereas a mobile communication terminal of the reception side uses the extrapolation pilot signal to estimate such a phase rotation amount as described above.

It is known that the estimation precision of the phase rotation amount is higher where a mobile communication terminal of the reception side uses an extrapolation pilot signal, which is transmitted successively, than where the mobile communication terminal uses an interpolation pilot signal, which is periodically embedded in a data slot. Thus, it is a possible idea to use only the extrapolation pilot signal without using the interpolation pilot signal.

However, in a mobile communication system which adopts the CDMA communication system, it is necessary to take a near-far problem in to consideration. In particular, TPC control (Transmission Power Control) is performed for a forward-link communication channel from a radio base station to a mobile communication terminal, and as the distance of the mobile communication terminal from the radio base station increases, the transmission power increases.

Accordingly, while an interpolation pilot signal interpolated in each individual communication channel is transmitted, by the TPC control, with higher transmission power as the distance of the mobile communication terminal from the radio base station increases, an extrapolation pilot signal is used commonly for different mobile communications and cannot be TPC-controlled for a particular one of the mobile communication terminals. In this manner, both of the interpolation and extrapolation pilot signals have merits and demerits, and one of them which should be adopted cannot be selected simply.

SUMMARY OF THE INVENTION

It is an object of the present invention to provide a mobile communication terminal which uses both of an extrapolation pilot signal and an interpolation pilot signal taking characteristics of them into consideration to achieve improvement of the channel estimation precision and also of the synchronous detection capacity.

In order to attain the object described above, according to an aspect of the present invention, there is provided a mobile communication terminal for CDMA communication wherein a pilot signal is used for phase correction of a reception signal, comprising a first pilot signal despreading section for despreading a first pilot signal spread with a spread code different from a spread code of a communication channel including the data signal, a second pilot signal despreading section for despreading a second pilot signal inserted in the data signal and spread with a spread code same as the spread code for the data signal, a first complex calculation section for performing complex calculation processing for the signal for which the despreading processing has been performed by the first pilot signal despreading section and outputting a result of the complex calculation processing as a first calculation processing result, a second complex calculation section for performing complex calculation processing for the signal for which the despreading processing has been performed by the second pilot signal despreading section and outputting a result of the complex calculation processing as a second calculation processing result, and a correction amount output section for outputting a phase correction amount for the phase correction using the first calculation processing result and the second calculation processing result.

Preferably, the correction amount output section includes a first reception quality measurement section for measuring a first reception quality index value by the first pilot signal using the first calculation processing result, a second reception quality measurement section for measuring a second reception quality index value by the second pilot signal using the second calculation processing result, a first phase correction amount calculation section for calculating a phase correction amount for the reception signal using the first calculation processing result and outputting the phase correction amount as a first correction amount, a second phase correction amount calculation section for calculating a phase correction amount for the reception signal using the second calculation processing result and outputting the phase correction amount as a second correction amount, a distribution ratio setting section for setting distribution ratio parameters for the first correction amount and the second correction amount based on the first reception quality index value and the second reception quality index value, and an output section for calculating values with which the first correction amount and the second correction amount are distributed based on the distribution ratio parameters from the distribution ratio setting section and outputting the values as the phase correction amount.

The distribution ratio setting section may set the distribution ratio parameters such that, as the first reception quality index value deteriorates relative to the second reception quality index value, the distribution ratio of the second correction amount increases relative to the distribution ratio of the first correction amount.

Otherwise, the distribution ratio setting section may set the distribution ratio parameters such that, where the first reception quality index value is higher than the second reception quality index value, the first correction amount from the first phase correction amount calculation section is outputted as the phase correction amount, but where the first reception quality index value is lower than the second reception quality index value, the second correction amount from the second phase correction amount calculation section is outputted as the phase correction amount.

Further, the distribution ratio setting section may set, for the second reception quality index value which is an object of discrimination in magnitude from the first reception quality index value, a comparison margin value corresponding to the kind of the reception quality index value, and set the distribution ratio parameters corresponding to the first reception quality index value and a value obtained by adding the comparison margin value to the second reception quality index value.

According to another aspect of the present invention, there is provided a mobile communication terminal for CDMA communication wherein a phase correction amount of a reception signal to be corrected is estimated using a received pilot signal, comprising an estimation result output section for estimating the phase correction amount based on both of pilot signals spread with different spread codes and transmitted to the mobile communication terminal.

Preferably, the pilot signals spread with the different spread codes include a first pilot signal transmitted intermittently with individual communication channels outside a data signal transmission period and a second pilot signal transmitted with a communication channel also within the data signal transmission period, and the estimation result output section estimates the phase correction amount such that, as the reception quality of the second pilot signal deteriorates, the degree of influence of the first pilot signal is raised in comparison with the degree of influence of the second pilot signal.

According to a further aspect of the present invention, there is provided a mobile communication terminal for a mobile communication system wherein channel estimation is performed using a known signal, comprising a channel estimation section for performing channel estimation using a first known signal to be used commonly by a plurality of mobile communication terminals and a second known signal to be used by a particular mobile communication terminal.

Preferably, the channel estimation section weights the first known signal and the second known signal in response to a reception quality of the first known signal and a reception quality of the second known signal to perform the channel estimation.

Otherwise, the channel estimation section may weight the first known signal or the second known signal in response to a reception quality of the first known signal or a reception quality of the second known signal to perform the channel estimation.

With the mobile communication terminal according to the present invention, the correction amount output section uses both of a first calculation processing result and a second calculation processing result and outputs a phase rotation amount for phase correction for a reception signal as an estimation result. Consequently, since both of an extrapolation pilot signal and an interpolation pilot signal are used, not only the precision in estimation can be improved and the stability can be assured, but also a good reception sensitivity after phase correction can be assured. As a result, the transmission power control can be optimized, and the transmission level of the radio base station can be lowered thereby to increase the system capacity.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 5 is a view illustrating the manner of the TPC control;

FIG. 8 is a diagram showing reception levels of a demodulated extrapolation pilot signal and interpolation pilot signal which vary depending upon the distance between a base station and a mobile station.

DESCRIPTION OF THE PREFERRED EMBODIMENT

Description of an Embodiment of the Present Invention

In the following, an embodiment of the present invention is described with reference to the drawings.

Figure 1:
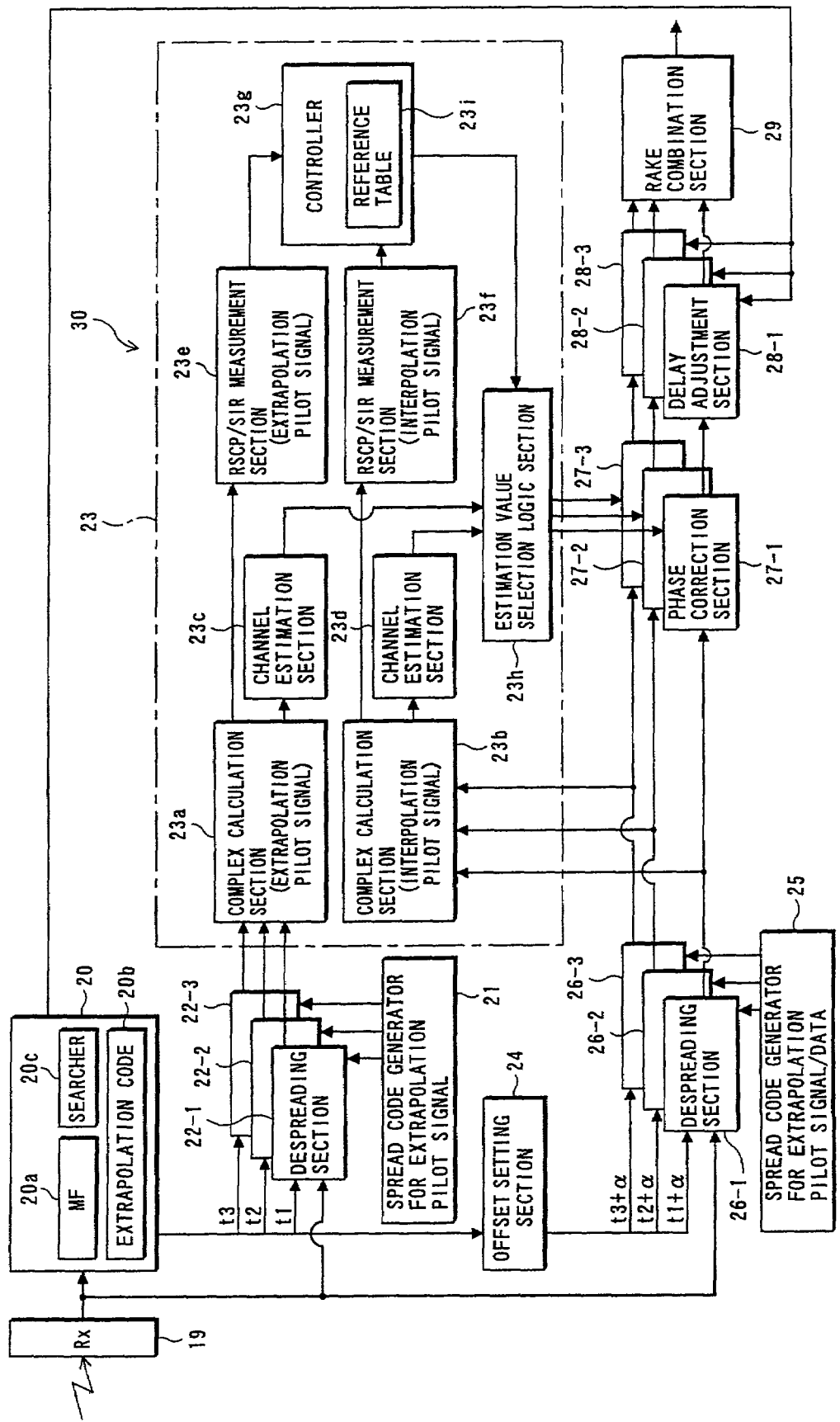
FIG. 1 is a block diagram showing a reception system of a mobile communication terminal to which a mobile communication terminal according to an embodiment of the present invention is applied.
Figure 2:
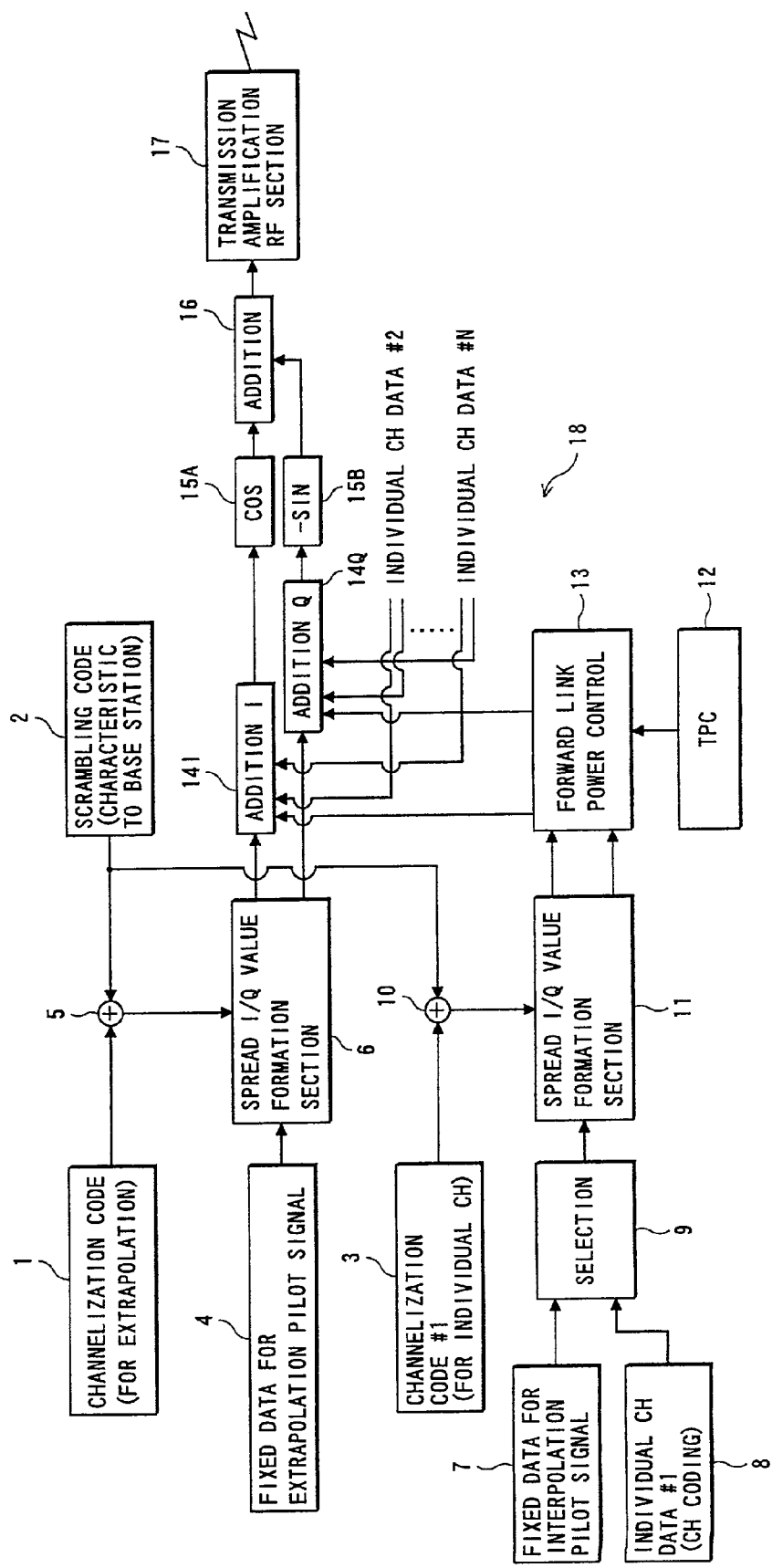
FIG. 2 is a block diagram showing a transmission system of a base station.

FIG. 1 is a block diagram showing a reception system of a mobile communication terminal according to the embodiment of the present invention. FIG. 2 is a block diagram showing a transmission system of a base station. The transmission system has a function of transmitting an interpolation pilot signal (second pilot signal) and an extrapolation pilot signal (first pilot signal).

Prior to the description of a configuration of the mobile communication terminal which is a characteristic part of the present invention, the transmission system of the base station which is a premise of operation of the reception system of the mobile communication terminal is described taking notice of transmission manners of an extrapolation pilot signal and an interpolation pilot signal and a manner of transmission power control.

Referring first to FIG. 2, a transmission system 18 of a radio base station (which may be hereinafter referred to merely as a base station) shown includes, as spread codes, a channelization code 1 for an extrapolation pilot signal, a scrambling code 2 characteristic to the base station, and channelization codes 3 (in FIG. 2, only that for a communication channel #1 is shown) for individual communication channels #1 to #n.

The channelization code 1 for an extrapolation pilot signal described above and channelization codes for the communication channels are different each other. In other words, the extrapolation pilot signal is transmitted as a channel separate from the channels #1 to #n.

Further, reference numeral 5 denotes an adder which adds the channelization code 1 and the scrambling code 2. Reference numeral 6 denotes a spread I/Q value formation section which performs a spreading process for fixed data 4 for an extrapolation pilot signal using the spread code added by the adder 5 and outputs resulting data as I/Q values. It is to be noted that, as the fixed data 4 for an extrapolation pilot signal, data of a known pattern (for example, data such as all "0s") can be used.

Reference numeral 9 denotes a selection section which selectively outputs either one of fixed data 7 for an interpolation pilot signal and data of the communication channel #1 (individual CH data #1) 8. The fixed data 7 for an interpolation pilot signal can be inserted into and outputted together with the data 8 of the communication channel #1 (individual CH data #1) by the selection section 9.

Reference numeral 10 denotes an adder which adds the channelization code 3 for the communication channel #1 and the scrambling code 2, and reference numeral 11 denotes a spread I/Q value formation section which performs a spreading process for the data of the communication channel #1 and outputs resulting data as I/Q values. In particular, the spread I/Q value formation section 11 performs the spreading process for the data 8, in which the fixed data 7 for an interpolation pilot signal is inserted, using the spread code added by the adder 10 and outputs resulting data as I/Q values.

Reference numeral 12 denotes a TPC section which outputs an instruction for controlling the transmission power to a mobile communication terminal. Reference numeral 13 denotes a forward link power control section which controls the transmission power (forward link power) of the spread data of the channel #1 from the spread I/Q value formation section 11 based on the instruction from the TPC section 12. It is to be noted that, while the function sections for the data of the communication channel #1 are described, other non-illustrated function sections corresponding to the selection section 9, adder 10, spread I/Q value formation section 11, TPC section 12 and forward link power control section 13 may be provided for the other communication channels #2 to #N.

Further, reference characters 14I and 14Q each denotes an adder. The adder 14I adds the data (I value) spread by the spread I/Q value formation section 6 and data (I values) of the communication channels #1 to #N to which power control is performed. Similarly, the adder 14Q adds the data (Q value) spread by the spread I/Q value formation section 6 and data (Q values) of the communication channels #1 to #N to which the power control is performed.

Reference character 15A denotes a cosine multiplication section which multiplies data from the adder 14I by a cosine function (cos). Reference character 15B denotes a sine multiplication section which multiplies data from the adder 14Q by a sine function (−sin). Reference numeral 16 denotes an adder which adds arithmetic operation results from the cosine multiplication section 15A and the sine multiplication section 15B. Thus the cosine multiplication section 15A, sine multiplication section 15B and adder 16 can convert data from I/Q values back into original vector information.

Further, reference numeral 17 denotes a transmission amplification RF section. The transmission amplification RF section 17 performs amplification and RF (Radio Frequency) signal processing for a transmission signal in the form of a vector and performs radio transmission of a resulting signal to a mobile communication terminal.

Figure 3:
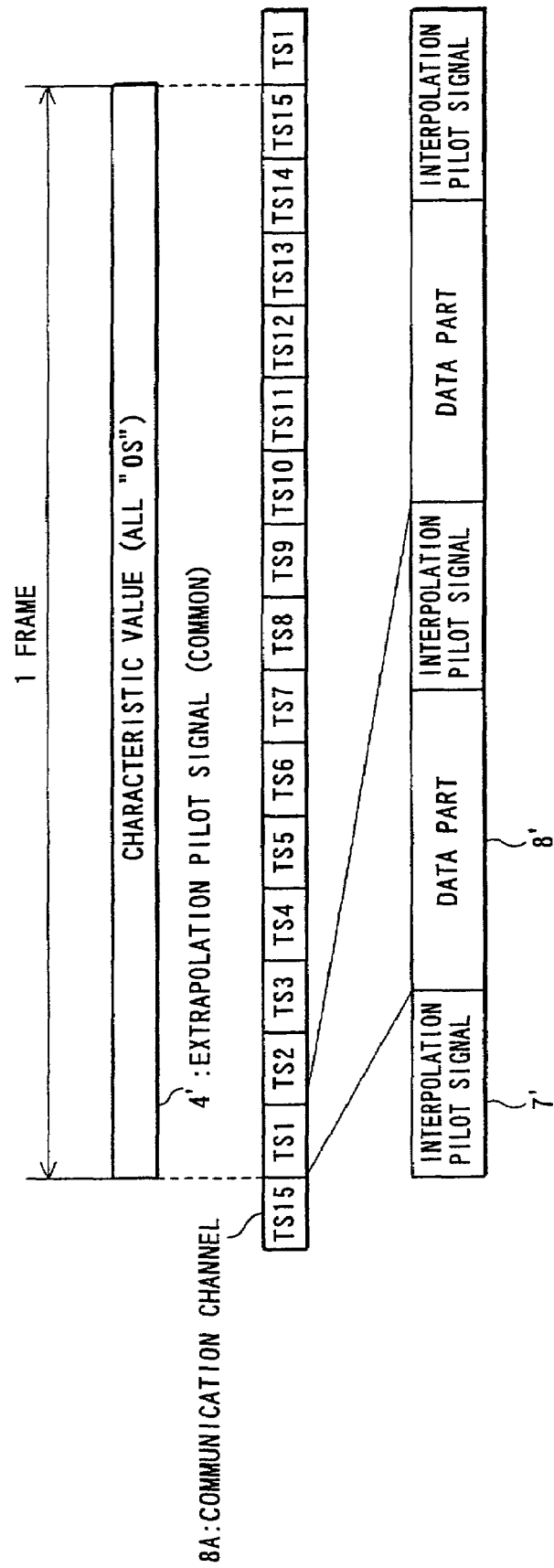
FIG. 3 is a diagrammatic view illustrating timings of an extrapolation pilot signal and an interpolation pilot signal.

Incidentally, the data of the communication channels and the spread data of the extrapolation pilot signal are transmitted, for example, at such a timing as illustrated in FIG. 3. In particular, an extrapolation pilot signal 4' and effective symbols of the communication channels are transmitted at the same timing (same propagation path). Thus the extrapolation pilot signal in a unit of 1 frame and the data (TS1 to TS15) of the communication channel in a unit of 15 slots can be transmitted in synchronism with each other.

On the other hand, the interpolation pilot signal is periodically inserted into data of the communication channels 8A and, more particularly, is time division multiplexed in the data slots of the communication channels 8A. In other words, in the selection section 9 shown in FIG. 2 described above, a data slot formed from a pair of an interpolation pilot signal 7' and a data part 8' is formed by selectively outputting data for an interpolation pilot signal in a unit of data of a predetermined length.

Incidentally, while the signal transmitted from the transmission system 18 of the base station described above is received by a reception system of a mobile communication terminal, the reception system 30 of the mobile communication terminal is configured, for example, in such a manner as shown in FIG. 1.

Referring to FIG. 1, in the reception system 30 shown, reference numeral 19 denotes a radio reception section (Rx) which receives a transmission signal from the transmission system 18 of the base station by radio and converts it into an electric signal. Reference numeral 20 denotes a path detection section which detects a path of a reception signal. The path detection section 20 includes a matched filter (MF) 20a and a searcher 20c.

The matched filter 20a calculates a correlation between bit data of the reception signal from the radio reception section 19 and a spread code 20b for an extrapolation pilot signal. The searcher 20c extracts reception timings (t1 to t3) of reception signals received through a plurality of paths (in FIG. 1, three paths) based on the correlation value calculated by the matched filter 20a.

Reference numeral 21 denotes a spread code generator which generates a spread code for an extrapolation pilot signal. Reference characters 22-1 to 22-3 each denotes a despreading section which performs despreading for the reception signal from the radio reception section 19 using a spread code for an extrapolation pilot signal generated by the spread code generator 21 based on the reception timings of the reception signal in the path extracted by the searcher 20c.

In particular, the despreading section 22-1 performs despreading for the reception signal from the radio reception section 19 using the spread code generated by the spread code generator 21 based on the reception timing t1 from the path detection section 20. The despreading section 22-2 performs the despreading for the reception signal received at the reception timing t2 with the spread code just described. The despreading section 22-3 performs despreading for the reception signal received at the reception timing t3 using the spread code just described.

In other words, the despreading sections 22-1 to 22-3 have a function as a first pilot signal despreading section which performs despreading for the first pilot signal spread with a spread code separate from a spread code of a communication channel including a data signal.

Reference numeral 23 denotes a channel estimation apparatus. The channel estimation apparatus 23 estimates a phase correction amount (phase rotation amount) for phase correction sections 27-1 to 27-3 which are hereinafter described. More particularly, the channel estimation apparatus 23 uses an extrapolation pilot signal and an interpolation pilot signal both as pilot signals used for channel estimation described below.

Reference numeral 24 denotes an offset setting section which performs setting of an offset timing α for each communication channel. Reference numeral 25 denotes a spread code generator which generates a spread code for a communication channel (a spread code for an interpolation pilot signal and data). Reference characters 26-1 to 26-3 each denotes a despreading section which performs despreading for a reception signal from the radio reception section 19 with a spread code from the spread code generator 25 based on reception timings to which the offset timing α has been added by the offset setting section 24.

More particularly, the despreading section 26-1 despreads a reception signal with a spread code of the communication channel based on a reception timing t1+α. The despreading section 26-2 despreads a reception signal with a spread code of the communication channel based on a reception timing t2+α. The despreading section 26-3 despreads a reception signal with a spread code of the communication channel based on a reception timing t3+α.

Thus the despreading sections 26-1 to 26-3 described above have a function as a second pilot signal despreading section which despreads a second pilot signal inserted in a data signal and spread with a spread code same as that used for a data signal.

The phase correction sections 27-1 to 27-3 perform phase correction for reception signals despread by the corresponding despreading sections 26-1 to 26-3 using phase rotation amounts of the individual reception signals in correspondence paths estimated by the channel estimation apparatus 23.

Reference characters 28-1 to 28-3 each denotes a delay adjustment section. The delay adjustment sections 28-1 to 28-3 perform delay adjustment for signals from the phase correction sections 27-1 to 27-3 so that data of the reception timings based on route differences among the paths may be data at the same timing. A rake combination section 29 performs rake combination for three reception signals wherein the reception timings are adjusted to the same timing by the delay adjustment sections 28-1 to 28-3.

In the reception system 30 of the mobile communication terminal according to the present embodiment, the propagation paths (phase rotation amounts) of the paths are estimated by the channel estimation apparatus 23, and correction of the phase rotation amount is performed for all effective paths by the phase correction sections 27-1 to 27-3. Consequently, the S/N ratio of the reception signal obtained by the rake combination by the rake combination section 29 is improved and the reception characteristic is improved.

A desired signal playback process (for example, playback or the like as a voice signal) is performed for the signal obtained by the rake combination after a decoding process, an error correction process and so forth are performed.

Incidentally, the channel estimation apparatus 23 described above particularly includes complex calculation sections 23a and 23b, channel estimation sections 23c and 23d, RSCP/SIR measurement sections 23e and 23f, a controller 23g, and an estimation value selection logic section 23h.

The complex calculation section (first complex calculation section) 23a demodulates an extrapolation pilot signal by performing a complex calculation process for the despread extrapolation pilot signals from the despreading sections 22-1 to 22-3. The demodulated signals are outputted as a first complex calculation process result. The channel estimation section (first phase correction amount estimation section) 23c uses the first complex calculation process result from the complex calculation section 23a to calculate a phase rotation amount with respect to a known phase (a phase correction amount for the reception signal). A result of the calculation is outputted as a first correction amount to the estimation value selection logic section 23h in the following stage.

The complex calculation section (second complex calculation section) 23b demodulates an interpolation pilot signal by performing a complex calculation process for the despread interpolation pilot signals from the despreading sections 26-1 to 26-3. The demodulated interpolation pilot signal is outputted as a second complex calculation process result. The channel estimation section (second phase correction amount estimation section) 23d uses the second complex calculation process result from the complex calculation section 23b to calculate a phase rotation amount with respect to a known phase (a phase correction amount for the reception signal). A result of the calculation is outputted as a second correction amount to the estimation value selection logic section 23h in the following stage.

The two complex calculation sections 23a and 23b described above almost usually perform parallel operation for SIR measurement and hand-over control during communication.

The RSCP/SIR measurement sections 23e and 23f measure an RSCP (Received Signal Code Power; reception level (which may be referred to also as code power)) and an SIR (Signal to Interference and noise power Ratio) for both pilot signals.

In other words, the RSCP/SIR measurement section 23e has a function as a first reception quality measurement section which measures first reception quality index values (a reception level and an SIR) of an extrapolation pilot signal as a first pilot signal. The RSCP/SIR measurement section 23f has a function as a second reception quality measurement section which measures second reception quality index values (a reception level and an SIR) of an interpolation pilot signal as a second pilot signal.

It is to be noted that the RSCP/SIR measurement section 23f averages reception levels and SIRs as reception quality index value data measured in a predetermined cycle and uses the average values as measurement values of a reception quality index value by an interpolation pilot signal. Consequently, the precision as a reception quality index value by an interpolation pilot signal is secured.

The controller 23g receives reception level values and SIR values transmitted from the RSCP/SIR measurement sections 23e and 23f, and estimates an external reception environment from the values just described and sets and controls distribution ratio parameters for the estimation value selection logic section 23h, particularly, distribution ratio parameters for a phase rotation amount (refer to Vcp of an expression (1) given below) from the channel estimation section 23c and another phase rotation amount (refer to Vdp of the same expression) from the channel estimation section 23d. In other words, the controller 23g has a function as a distribution ratio setting section for setting a distribution ratio parameter for the first correction amount and the second correction amount described above based on a first reception quality index value and a second reception quality index value.

Further, the controller 23g includes a reference table 23i which stores distribution ratio parameters (refer to α and β in the expression (1) given below) and interference correction values (refer to A and B of the expression (1) given below) for canceling an influence of a known fixed interference wave in accordance with the reception level values and the SIR values measured from the interpolation pilot signal and the extrapolation pilot signal described above.

Further, the controller 23g can control to output a distribution ratio parameter and a phase correction value described above by referring to the reference table 23i based on the reception level values and the SIR values from the RSCP/SIR measurement sections 23e and 23f. Consequently, an optimum control parameter which is estimated to vary depending upon the configuration of hardware and an operation condition can be extracted quickly by memory accessing.

The reference table 23i stores optimum distribution ratio parameters ($\alpha$ and $\beta$ appearing in the expression (1) given below), which are set in accordance with a combination of a range of the SIR value and a range of a reception level of each pilot signal, and interference correction amounts (A and B appearing in the same expression). Further, if the situation varies as a result of variation of a reception method or the like (for example, fluctuation of the intersymbol interference amount), then the table is changed to cope with the variation of the situation.

Figure 7A:
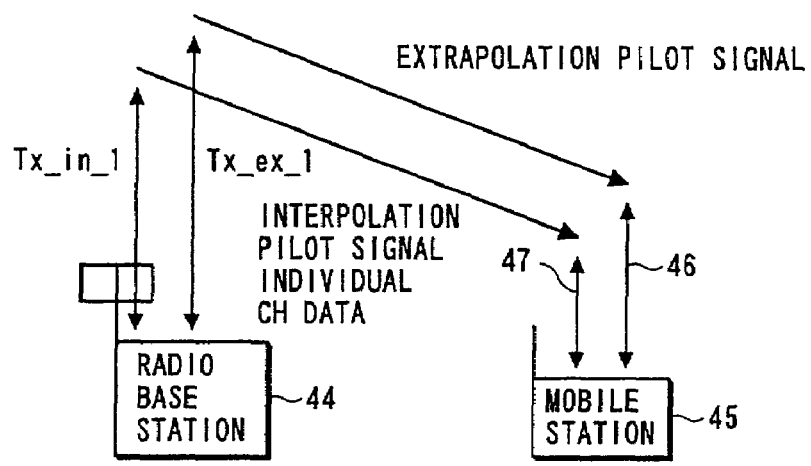
FIGS. 7(a) and 7(b) are diagrammatic views illustrating a manner of setting of a distribution ratio parameter by a controller in accordance with the TPC control.

In particular, for example, as shown in FIG. 7(a), if a reception quality index value (reception power or SIR) 46 of a demodulated extrapolation pilot signal is sufficiently higher (by a predetermined comparison margin value or more) than a reception quality index value (reception power or SIR) 47 of a demodulated interpolation pilot signal, then the controller 23g sets a distribution ratio index so that a phase rotation amount maybe estimated using only a demodulated extrapolation pilot signal (refer to a range P of the distance between a base station and a mobile station in FIG. 8).

Figure 7B:
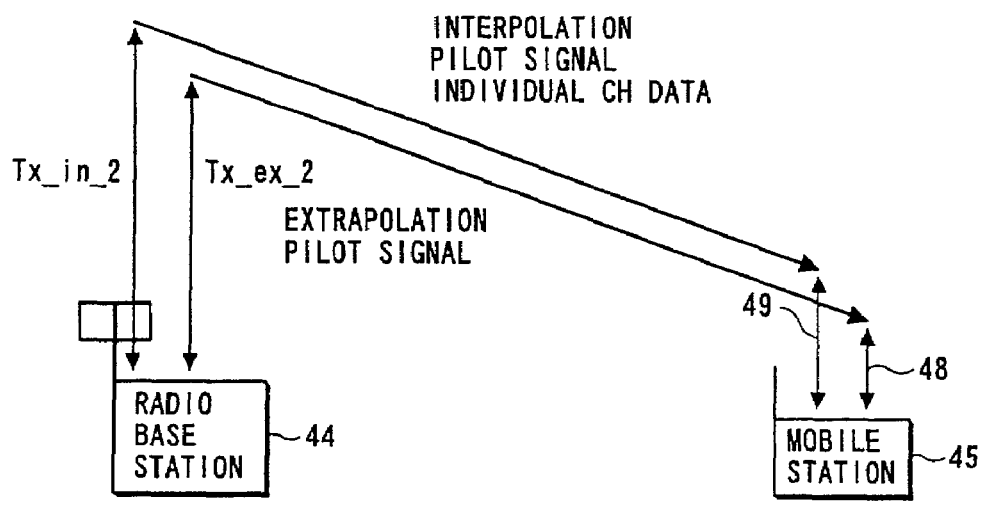

Further, as shown in FIG. 7(b), if the distance between the radio base station 44 and the mobile station 45 increases and the TPC of the radio base station 44 operates until a reception quality index value (reception power or SIR) 48 of the demodulated extrapolation pilot signal becomes sufficiently lower than a reception quality index value (reception power or SIR) 49 of the demodulated interpolation pilot signal, then the controller 23g sets the distribution ratio parameter so that the phase rotation amount may be estimated using only the demodulated interpolation pilot signal (refer to a range R of the distance between the base station and the mobile station in FIG. 8).

Further, if the distance between the radio base station 44 and the mobile station 45 has a value within an intermediate range Q between the ranges P and R described above, then the estimation value selection logic section 23h estimates a phase rotation amount using both of the demodulated extrapolation pilot signal and the demodulated interpolation pilot signal. More particularly, the distribution ratio parameter by the controller 23g is set such that the distribution ratio of the channel estimation value (second correction amount) from the channel estimation section 23d increases relative to the distribution ratio of the channel estimation value (first correction amount) from the channel estimation section 23c as the reception quality index value of the demodulated extrapolation pilot signal decreases relation to the reception quality index value of the interpolation pilot signal.

In other words, a comparison margin value in accordance with the type of the reception quality index value to the reception quality index value according to the interpolation pilot signal which is a comparison object for size discrimination with the reception quality index value according to the extrapolation pilot signal is set, and the controller 23g can set a distribution ratio parameter in accordance with the magnitudes of the values.

The estimation value selection logic section 23h receives the channel estimation values from the channel estimation section 23c and the channel estimation section 23d described above and also receives the distribution ratio parameter or the interference correction value from the controller 23g, and calculates a phase rotation amount of the pertaining path by calculation based on an expression for calculation which uses the values.

More particularly, the estimation value selection logic section 23h calculates a final phase rotation amount Vch in accordance with an expression (1) given below. In particular, a phase rotation amount calculated for each of the paths in accordance with the expression (1) by the estimation value selection logic section 23h is outputted to the phase correction sections 27-1 to 27-3 to perform phase correction:

$$Vch = \alpha \times (Vcp - A) + \beta \times (Vdp - B) \tag{1}$$

where Vcp represents the phase rotation amount (vector amount, output of the channel estimation section 23c of FIG. 1) based on the extrapolation pilot signal, Vdp represents the phase rotation amount (vector amount, output of the channel estimation section 23d of FIG. 1) based on the interpolation pilot signal, $\alpha$ and $\beta$ represent distribution ratio parameters which determine distribution of extrapolation/interpolation, and A and B represent correction values (vector amounts) for known fixed interference.

The estimation value selection logic section 23h calculates a value (calculation result of the expression (1)) distributed with the distribution ratio parameters based on the calculation process results (Vcp−A) and (Vdp−B) corrected with the interference correction values A and B, respectively, and outputs it as a phase rotation amount (estimation result) for each path.

For example, if the range of the distance between the base station and the mobile station shown in FIG. 8 is P, then $\alpha$ is set to "1", and $\beta$ is set to "0", but if the range is R, then $\alpha$ is set to "0", and $\beta$ is set to "1". However, if the range is Q, then $\alpha$ and $\beta$ are set such that, as the reception quality index value of the extrapolation pilot signal decreases relative to the reception quality index value of the interpolation pilot signal, $\alpha$ changes from "1" to "0" and $\beta$ changes from "0" to "1" stepwise or continuously.

In other words, the estimation value selection logic section 23h has a function as an output section which calculates values with which the calculation result from the channel estimation section 23c as a first correction amount and the calculation result from the channel estimation result 23d as a second correction amount are distributed based on the distribution ratio parameter from the controller 23g, and outputs the resulting values as phase correction amounts (estimation results).

Further, the channel estimation sections 23c and 23d, RSCP/SIR measurement sections 23e and 23f, controller 23g and estimation value selection logic section 23h have a function as a correction amount output section which outputs a phase correction amount for a reception signal using a calculation result from the complex calculation process section 23a as a first calculation process result and a calculation result from the complex calculation process section 23b as a second calculation process result. The function as the correction amount output section can be implemented using an arithmetic operation circuit (DSP; Digital Signal Processor).

Incidentally, as described with reference to FIG. 3, the interpolation pilot signal 7' is time-division multiplexed in data slots 8' which form a communication channel 8A. Accordingly, the channel estimation apparatus 23 described above with reference to FIG. 1 can not directly measure a phase error (phase error of an interval within which data is inputted) of the data part 8' only with the interpolation pilot signal 7', but merely average phase rotation amounts calculated using the intermittently inserted interpolation pilot signal 7' and uses a resulting value as the phase error.

In other words, as described in detail below, except when a signal component of a communication channel acts as noise upon reception of an extrapolation pilot signal, a method wherein a phase error is measured using an extrapolation pilot signal 4' with which a phase rotation amount of an interval within which data is inputted can be directly measured is characteristically advantageous when compared with another method wherein an phase error is measured using only an interpolation pilot signal. In the case just described, the ratio of a component of an extrapolation pilot signal is made higher than the ratio of a component of an interpolation pilot signal in accordance with the distribution ratio parameters to measure a phase rotation amount.

As described below, however, a signal component of a communication channel sometimes acts as noise upon reception of an extrapolation pilot signal because the TPC control operates. In the case just described, it is sometimes more appropriate to use not only an extrapolation pilot signal but also an interpolation pilot signal for estimation of a phase rotation amount than to use only an extrapolation pilot signal.

Figure 4:
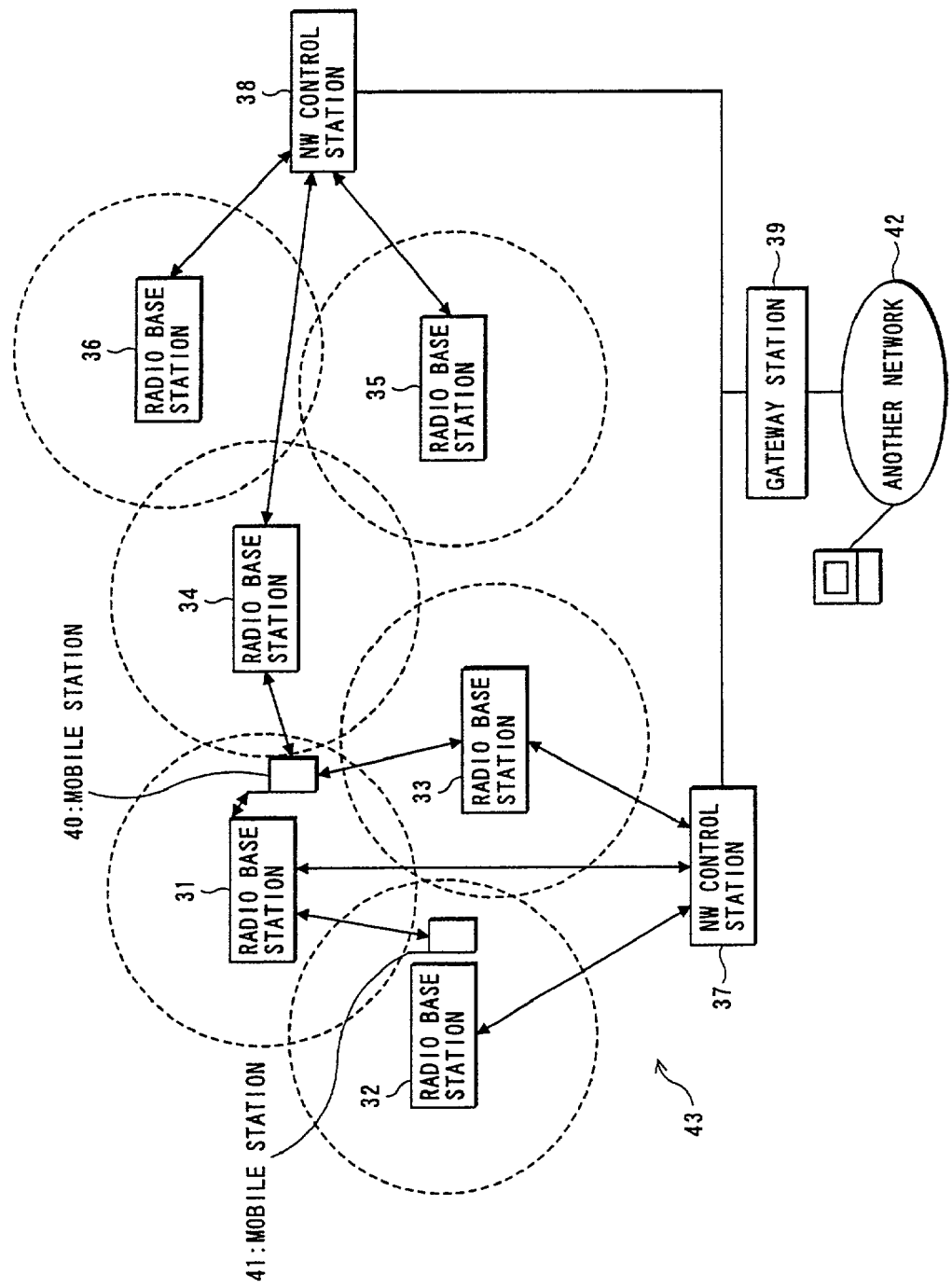
FIG. 4 is a diagrammatic view showing a mobile communication system and illustrating a manner of TPC control.

It is assumed here that, in such a mobile communication system 43 as shown in FIG. 4 which includes radio base stations 31 to 36, network (NW) control stations 37 and 38, a gateway station 39 for connection to another network 42, and mobile stations 40 and 41 as mobile communication terminals, the mobile stations 40 and 41 are in a communication state with the radio base station 31.

Further, it is assumed that the mobile station 40 is positioned in the neighborhood of the radio base station 31 while the mobile station 41 is positioned in the neighborhood of the radio base station 32. The mobile stations 40 and 41 receive an extrapolation pilot signal transmitted from the radio base station 31 and receive data transmitted from the radio base station 1 using the extrapolation pilot signal. In the case just described, also a communication channel between the radio base station 32 and the mobile station 40 or 41 itself is recognized as noise to the extrapolation pilot signal of the radio base station 31.

If the two mobile stations 40 and 41 receive the same service (for example, voice communication, non-limit digital communication, packet communication or the like), then it is necessary that a constant error rate be assured. If the error rate does not reach a level therefor, then substantial deterioration of sound quality, congestion of a packet communication system or the like occurs.

Where the CDMA system is applied, it is impossible to allocate an excessively high level to each channel to secure the error rate in order to secure a system capacity, for example, like a method of TDMA (Time Division Multiple Access) or the like. Therefore, in a communication channel, optimization of the level by transmission power control is required essentially. However, an extrapolation pilot signal is not an object of transmission power control for each individual mobile communication terminal, and imbalance in level between the communication channel and the extrapolation pilot signal described below occurs.

FIG. 5 is a diagrammatic view illustrating interference with an extrapolation pilot signal described above. In FIG. 5, the radio base station 31 transmits an extrapolation pilot signal with the 10 dBm level. It is assumed that the propagation losses of the extrapolation pilot signal to the mobile station 40 and the mobile station 41 are −70 dB and −90 dB, respectively. In other words, the mobile station 41 is positioned farther by a distance corresponding to 20 dB than the mobile station 40 from the radio base station 31. It is assumed that, in the case just described, the influence of the interference (another station interference) wave from the radio base station 32 is equivalent to −10 dB with the mobile station 40, and is equivalent to −20 dB with the mobile station 41. In other words, the mobile station 41 is positioned nearer by a distance corresponding to 10 dB than the mobile station 40 from the radio base station 32.

If it is assumed here that the reception level necessary to maintain an error rate required for services of the mobile stations 40 and 41 is −90 dBm, then the transmission level Tx_DCH1 of the communication channel (DCH1) from the radio base station 31 to the mobile station 40 is −10 dBm and the transmission level Tx_DCH2 of the communication channel (DCH2) from the radio base station 31 to the mobile station 41 is +20 dBm. In other words, the transmission levels of the communication channels DCH1 and DCH2 in the radio base station 31 are controlled to −10 dBm and +20 dBm, respectively, by the TPC.

The difference 30 dB between the two transmission levels Tx_DCH1 and Tx_DCH2 is the total of the propagation losses and interference. Meanwhile, the reception levels Rx_CPICH1 and Rx_CPICH2 of the extrapolation pilot signal received by the radio base stations 31 and 32 are Rx_CPICH1=−60 dBm and Rx_CPICH2=−80 dBm, respectively, by an influence of the propagation losses.

In this instance, the level ratios between the extrapolation pilot signals received by the mobile station 40 and individual interference waves are such as given by the following expressions (2) to (4):

Extrapolation pilot signal/communication channel:

$$Rx\_CPICH1/Rx\_DCH1=+20 \text{ dBm} \qquad (2)$$

Extrapolation pilot signal/another station interference:

$$Rx\_CPICH1/\text{another station interference}=-70 \text{ dBm} \qquad (3)$$

Interpolation pilot signal/another station interference:

$$Rx\_DCH1/\text{another station interference}=-90 \text{ dBm}$$

$$(\text{under } TPC \text{ control}) \qquad (4)$$

On the other hand, the level ratios between the extrapolation pilot signals received by the mobile station 41 and individual interference waves are such as given by the following expressions (5) to (7):

Extrapolation pilot signal/communication channel:

$$Rx\_CPICH2/Rx\_DCH2=-10 \text{ dBm} \qquad (5)$$

Extrapolation pilot signal/another station interference:

$$Rx\_CPICH2/\text{another station interference}=-100 \text{ dBm} \qquad (6)$$

Interpolation pilot signal/another station interference:

$$Rx\_DCH2/\text{another station interference}=-90 \text{ dBm}$$

$$(\text{under } TPC \text{ control}) \qquad (7)$$

Where control by the TPC is performed by the radio base station 31 as in the case described above, the reception characteristic of the extrapolation pilot signal from the radio base station 31 on the mobile station 41 clearly exhibits deterioration, and also the error rate of the communication channel exhibits deterioration.

Subsequently, deterioration of the reception sensitivity where phase correction is performed using a phase rotation amount estimated using an extrapolation pilot signal whose reception characteristic is deteriorated by the TPC as described above is described with reference to FIGS. 6(*a*) to 6(*d*).

Figure 6A:
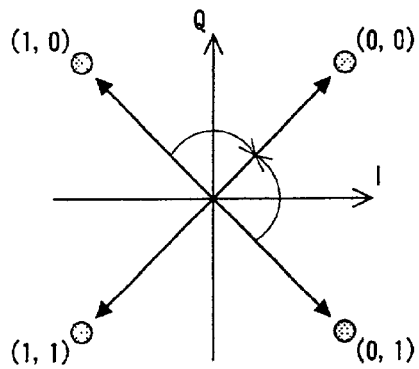
FIGS. 6(a) to 6(d) are diagrammatic views illustrating degradation of the reception sensibility by synchronous detection performed using a phase rotation amount estimated with an extrapolation pilot signal whose reception characteristic is degraded by the TPC control.

First, since a despreading timing is detected by the searcher 20c (refer to FIG. 1), despreading is possible even if no pilot signal is recognized. The reception signals are in a state spread with I/Q, and if they are demodulated (despreading+ integration in a unit of a symbol) and then mapped in an imaginary I/Q plane, then they can be represented as such rotational vectors as illustrated in FIG. 6(a). It is to be noted that this is based on the premise that the levels of the reception signals after AD conversion are kept fixed by AGC (Automatic Gain Control).

Figure 6B:
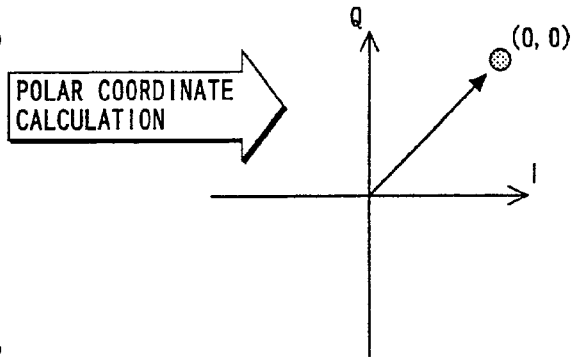

As seen from FIG. 6(a), since the value of the pilot signal is known, if the position of the pilot signal in a frame is discriminated, then such pilot signals can be collected to one point as seen in FIG. 6(b) if fixed rotation processing (polar coordinate calculation) is performed for them. Actually, however, the received vectors are rotated by carrier deviation between the ratio base station and the mobile station and fluctuation of the delay amount in the propagation path.

Figure 6C:
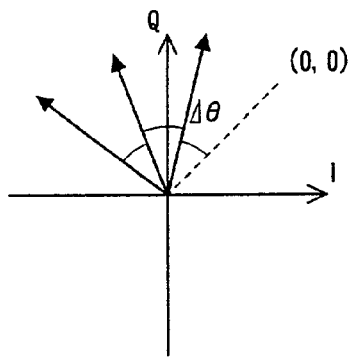

If the position of the pilot signal on the I/Q plane is known, then if the rotation amount $\Delta\theta$ (refer to FIG. 6(c) and the expression (8) below) of the vector in a unit time is measured, then this results in that the propagation delay (including a carrier deviation) of each path is measured (channel estimation). If the phase of the actual signal vector is corrected by polar coordinate matrix calculation given by the following expression (9) using the measured rotation amount $\Delta\theta$, then this results in that the mobile station uses a carrier commonly to the radio base station and can realize synchronous detection.

$$\begin{pmatrix} Ri \\ Rq \end{pmatrix} = \begin{pmatrix} \cos\Delta\theta & -\sin\Delta\theta \\ \sin\Delta\theta & \cos\Delta\theta \end{pmatrix} \begin{pmatrix} Di \\ Dq \end{pmatrix} \quad (8)$$

$$\Delta\theta = \theta move + \theta error \quad (9)$$

where $\theta$ move represents the phase variation by the temperature/fading/multi-paths and so forth, $\theta$ error represents the phase variation by the carrier frequency deviation between the radio base station and the mobile station, (Ri, Rq) represents the reception vector, and (Di, Dq) represents the actual signal vector.

Figure 6D:
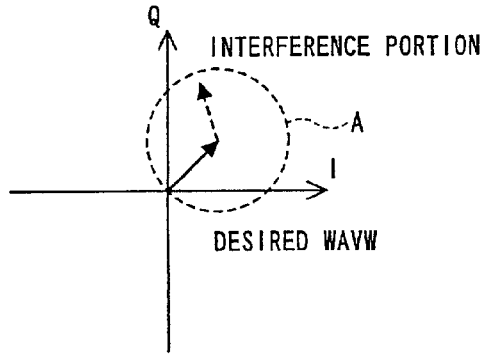

Incidentally, where only the extrapolation pilot signal is used to perform channel estimation, if the reception performance of the extrapolation pilot signal deteriorates, then the precision in channel estimation is deteriorated, and this disables correction of the rotation amount of a vector on the I/Q plane and makes precise demodulation difficult. A variation of a vector signal when interference is superposed on a pilot signal is illustrated in FIG. 6(d). Where the interference is at random, the intersecting point is dispersed within such a range as indicated by a middle point line A of FIG. 6(d), and the rotation amount cannot be measured precisely.

In particular, the SIR value obtained from a ratio between a desired wave intensity B and an interference wave intensity C which is dispersed within such a range as indicated by a middle point line A deteriorates inevitably. Here, when the phase of the communication channel is corrected, if the vector is displaced from a quadrant to which it is mapped originally, then an error occurs. Even when the reception level is high and interference is little, if the correction of the rotation amount is imprecise, then errors increase.

The extrapolation pilot signal enables channel estimation at a timing same as that of received data and is considerably advantageous from a point of view of a circuit. However, the SIR of the extrapolation pilot signal is deteriorated by the communication channel itself increased by the TPC (transmission power control) as described hereinabove with reference to FIG. 5. In other words, control for raising the sensitivity deteriorates the sensitivity conversely.

Incidentally, the interpolation pilot signal allows channel estimation only at timings before and after a signal to be demodulated. In order to raise the precision, an averaging process is required, and the interpolation pilot signal is inferior also in characteristic to the extrapolation pilot signal.

However, different from the extrapolation pilot signal, with the interpolation pilot signal, increase of interference by the communication channel itself does not occur at all because the reception level at the mobile station is interlocked with the TPC operation. The interpolation pilot signal exhibits a displacement also in regard to the timing. Also with regard to deterioration by external interference of FIG. 4, while the extrapolation pilot signal exhibits deterioration of the SIR only by an amount corresponding to the interference, with regard to the interpolation pilot signal, the level is increased by the TPC control to correct the deterioration thereof. For example, if the reception sensitivity is deteriorated by interference equivalent to −10 dB, then control to increase the level by +10 dB is performed so that the SIR is maintained.

Therefore, in the channel estimation apparatus 23 in the present embodiment, both of the extrapolation pilot signal and the interpolation pilot signal are used as pilot signals for use for estimation of a phase rotation amount. In particular, since the channel estimation apparatus 23 estimates the phase oration amount in accordance with the expression (1) given hereinabove, the precision in estimation of the phase rotation amount can be improved and the stability can be assured without depending upon conditions of the TPC, and a good reception sensitivity is assured as the reception sensitivity after the phase correction.

In the mobile communication system according to the present embodiment having the configuration described above, the radio base station transmits communication channels #1 to #N spread individually with spread codes and an extrapolation pilot signal. Meanwhile, the mobile communication terminal (mobile station) receives a signal component of one communication channel together with the extrapolation pilot signal described above.

In particular, the path detection section 20 detects paths for rake combination of the channel of the mobile communication terminal itself and detects reception timings t1 to t3 of signal components received through the paths. Then, the despreading sections 22-1 to 22-3 despread the reception signals received through the paths with the spread code for an extrapolation pilot signal, and the despreading sections 26-1 to 26-3 despread the reception signals with a spread code for the communication channel of the mobile communication terminal itself.

The phase correction sections 27-1 to 27-3 perform phase correction of the signals of the communication channels despread by the despreading sections 26-1 to 26-3, respectively, using the phase rotation amounts estimated by the channel estimation apparatus 23 to perform delay adjustment and then rake combine the signals.

In this instance, the complex calculation section 23a of the channel estimation apparatus 23 performs the complex calculation process represented by the expression (9) given hereinabove for the despreading signals from the despreading sections 22-1 to 22-3 to demodulate the extrapolation pilot signal. Meanwhile, the complex calculation section 23b performs the complex calculation process represented by the expression (9) for signal components of the interpolation pilot signal from within the despreading signals from the despreading sections 26-1 to 26-3 to demodulate the interpolation pilot signal.

Further, the RSCP/SIR measurement section 23e measures the reception level and the SIR (ratio between the desired wave intensity of the extrapolation pilot signal and the interference wave intensity of the demodulated extrapolation pilot signal) using the extrapolation pilot signal demodulated by the complex calculation section 23a described above. Similarly, the RSCP/SIR measurement section 23f measures the reception level and the SIR using the interpolation pilot signal demodulated by the complex calculation section 23b.

The estimation value selection logic section 23h receives the channel estimation values calculated using the extrapolation pilot signal and the interpolation pilot signal demodulated as described above as inputs thereto and performs arithmetic operation processing substituting the received values into Vcp and Vdp of the expression (1) given hereinabove to determine channel estimation values for the individual paths, and then outputs the channel estimation values to the phase correction sections 27-1 to 27-3. It is to be noted that, as the parameters α, β, A and B in the expression (1), the controller 23g refers to the reference table 23i based on the reception levels and the SIRs measured by the RSCP/SIR measurement sections 23e and 23f to those values with which an optimum reception sensitivity can be obtained, and conveys the thus extracted values to the estimation value selection logic section 23h.

It is to be noted that, in the actual environment, the level of a communication channel is normally varying by transmission power control, and also the interference amount from the communication channel itself of the mobile communication terminal itself varies depending upon the situation. Also in the channel estimation apparatus 23, the parameters of the expression (1) are modified in accordance with the situations of the demodulated extrapolation pilot signal and interpolation pilot signal to improve the characteristic.

Further, in each of the phase correction sections 27-1 to 27-3, the phase rotation amount estimated in this manner is used to perform phase correction to place the reception sensitivity into an optimum condition.

In this manner, with the mobile communication terminal according to the embodiment of the present invention, since it includes the complex calculation sections 23a and 23b, channel estimation sections 23c and 23d, RSCP/SIR measurement sections 23e and 23f, controller 23g and estimation value selection logic section 23h, both of an extrapolation pilot signal and an interpolation pilot signal are used as pilot signals for use for estimation of a phase rotation amount to reduce the influence of interference upon the extrapolation pilot signal. Consequently, not only the precision in channel estimation (estimation of a phase rotation amount) can be improved and the stability can be assured, but also a good reception sensitivity after phase correction can be assured. As a result, the transmission power control can be optimized, and the transmission level of the radio base station can be lowered thereby to increase the system capacity.

(b) Others

The mobile communication terminal of the present invention can be applied not only to a system according to the embodiment described above but also to a base band reception system of the known CDMA system which adopts both of an extrapolation pilot signal and an interpolation pilot signal.

Further, while the channel estimation apparatus 23 in the embodiment described above uses the expression (1) to estimate a phase rotation amount, according to the present invention, the estimation of a phase rotation amount is not limited to this, but a phase rotation amount may be estimated otherwise by merely changing over between a demodulated extrapolation signal and a demodulated interpolation pilot signal across a boundary of an SIR, a reception level or the like. Also in this instance, the two pilot signals can be compared with each other to use one of them which has a better characteristic to perform synchronous detection.

Furthermore, while the channel estimation apparatus 23 described above uses a combination of a reception level and an SIR as reception quality index values (a first reception quality index value and a second reception quality index value), according to the present invention, the configuration of the channel estimation apparatus 23 is not limited to this, but the controller 23g may otherwise be configured such that it uses a single reception quality index value to set a distribution ratio parameter described hereinabove. Also in this instance, similar advantages to those of the embodiment described above can be achieved.

In this instance, the first and second reception equality measurement sections as function sections denoted by reference characters 23e and 23f in FIG. 1 may be configured as a function section which measures only a single kind of reception quality index value, and the controller 23g may use a reference table which stores distribution ratio parameters based on the single kind of reception quality index value.

As the single kind of reception quality index value described above, in addition to a reception level of a demodulated pilot signal, for example, an SIR, a signal to noise ratio (Eb/Io) in a unit of a bit, or a calculation value of the number of errors of demodulated extrapolation pilot signal and interpolation pilot signal. Naturally, any arbitrary combination of such index values may be used.

Further, while the comparison margin value in the embodiment described above may be set as an absolute value (for example, a decibel value where the reception level is used as the reception quality index value), also an alternative configuration wherein substantially no margin value is used (0 dB) is possible. This similarly applies also where any other value than the reception level is used as the reception quality index value.

In this instance, the estimation value selection logic section 23h sets the distribution ratio parameters so that, when the reception quality index value from the RSCP/SIR measurement section 23e is higher than the reception quality index value from the RSCP/SIR measurement section 23f, the channel estimation value from the channel estimation section 23c may be outputted as a phase correction amount, but when the reception quality index value from the RSCP/SIR measurement section 23e is lower than the reception quality index value from the RSCP/SIR measurement section 23f, the channel estimation value from the channel estimation section 23d may be outputted as a phase correction amount.

Furthermore, while the control in the embodiment described above is directed to decrease of the degree of influence of the extrapolation pilot signal as a common pilot signals when the reception power of the extrapolation pilot signal is low, according to the present invention, the TPC may be used particularly in an area near to a radio base station so that the influence of the extrapolation pilot signal may be great when compared with an individual pilot signal which apparently has a high reception power.

Further, the present invention can naturally be applied also to a mobile communication terminal to which a communication system other than the CDMA communication system is applied.

Furthermore, the present invention can be carried out within the spirit and scope of thereof irrespective of the embodiments described above.

Further, it is possible to produce the apparatus according to the present invention in accordance with the embodiments disclosed as above.

What is claimed is:

1. A mobile communication terminal for CDMA communication wherein a pilot signal is used for phase correction of a reception signal, comprising:
   a first pilot signal despreading section for despreading a first pilot signal spread with a spread code different from a spread code of a communication channel including a data signal;
   a second pilot signal despreading section for despreading a second pilot signal inserted in the data signal and spread with the spread code for the data signal;
   a first complex calculation section for performing complex calculation processing on a signal which despreading processing has been performed by said first pilot signal despreading section and outputting a result of the complex calculation processing as a first calculation processing result;
   a second complex calculation section for performing complex calculation processing on a signal which despreading processing has been performed by said second pilot signal despreading section and outputting a result of the complex calculation processing as a second calculation processing result; and
   a correction amount output section for outputting a phase correction amount for phase correction using the first calculation processing result and the second calculation processing result, wherein the correction amount output section measures first and second reception quality index values from the first and second pilot signals, respectively, calculates respective values with which the first calculation processing result and the second calculation processing result are distributed based on respective distribution ratio parameters, which the distribution ratio parameters are set on the basis of the first and second reception quality index values, and outputs first and second phase correction values respective to the distribution ratio parameters as the phase correction amount.

2. A mobile communication terminal as claimed in claim 1, wherein said correction amount output section includes:
   a first reception quality measurement section for measuring a the first reception quality index value of the first pilot signal using the first calculation processing result;
   a second reception quality measurement section for measuring the second reception quality index value of the second pilot signal using the second calculation processing result;
   a first phase correction amount calculation section for calculating the first phase correction value for the reception signal using the first calculation processing result and outputting the first phase correction value;
   a second phase correction amount calculation section for calculating the second phase correction value for the reception signal using the second calculation processing result and outputting the second phase correction value;
   a distribution ratio setting section for outputting distribution ratio parameters for the first phase correction value and the second phase correction value based on the first reception quality index value and the second reception quality index value; and
   an output section for calculating values with which the first phase correction value and the second phase correction value are distributed based on the distribution ratio parameters from said distribution ratio setting section and outputting the first and second phase correction values based on the distribution ratio parameters as the phase correction amount.

3. A mobile communication terminal as claimed in claim 2, wherein said distribution ratio setting section sets the distribution ratio parameters such that, as the first reception quality index value deteriorates relative to the second reception quality index value, the distribution ratio of the second phase correction value increases relative to the distribution ratio of the first phase correction value.

4. A mobile communication terminal as claimed in claim 2, wherein said distribution ratio setting section sets the distribution ratio parameters such that, where the first reception quality index value is higher than the second reception quality index value, the first phase correction value from said first phase correction amount calculation section is outputted as the phase correction amount, but where the first reception quality index value is lower than the second reception quality index value, the second phase correction value from said second phase correction amount calculation section is outputted as the phase correction amount.

5. A mobile communication terminal as claimed in claim 4, wherein said distribution ratio setting section sets, for the second reception quality index value which is an object of discrimination in magnitude from the first reception quality index value, a comparison margin value corresponding to a kind of reception quality index value, and sets the distribution ratio parameters corresponding to the first reception quality index value and a value obtained by adding the comparison margin value to the second reception quality index value.

6. A mobile communication terminal for CDMA communication wherein a phase correction amount of a reception signal to be corrected is estimated using a received pilot signals, comprising:
   an estimation result output section for estimating a phase correction amount based on each of pilot signals spread with different spread codes and transmitted to said mobile communication terminal, wherein the pilot signals spread with the different spread codes include a first pilot signal transmitted intermittently by a first communication channel and a second pilot signal transmitted by a second communication channel commonly received by a plurality of mobile communication terminals, and said estimation result output section measures first and second reception quality index values based upon the first and second pilot signals, respectively, and estimates a phase correction amount based upon the first and second reception quality index values such that, as the second reception quality index value deteriorates, the degree of influence of the first pilot signal is raised in comparison with the degree of influence of the second pilot signal.

7. A mobile communication terminal for a mobile communication system wherein channel estimation is performed using known signals, comprising:
   a channel estimation section for performing channel estimation using a first known signal used commonly by a plurality of mobile communication terminals including the mobile communication terminal and a second known signal used by only the mobile communication terminal, wherein said channel estimation section measures first and second reception quality index values from the first and second known signals, respectively, and weights the first known signal and the second known signal based on respective distribution ratio parameters, which the distribution ratio parameters are set in response to the first reception quality index value and the second reception quality index value to perform the channel estimation.

8. A mobile communication terminal as claimed in claim 2, wherein each of said first reception quality measurement section and said second reception quality measurement section measures a reception levels as the first and second reception quality index values.

9. A mobile communication terminal as claimed in claim 2, wherein each of said first reception quality measurement section and said second reception quality measurement section measures a signal to interference and noise power ratios or a signal to noise ratios as the first and second reception quality index values.

10. A mobile communication terminal as claimed in claim 2, wherein each of said first reception quality measurement section and said second reception quality measurement section calculates, as first and second reception quality index values, a reception levels and a number of errors of a pattern of the pilot signal.

11. A mobile communication terminal as claimed in claim 2, wherein said distribution ratio setting section includes a reference table for storing distribution ratio parameters corresponding to a relationship between the first reception quality index value and the second reception quality index value and refers to said reference table based on the reception quality index values from said first reception quality measurement section and said second reception quality measurement section to control and output the distribution ratio parameters.

12. A mobile communication terminal as claimed in claim 2, wherein said second reception quality measurement section averages reception quality index value data measured within a predetermined interval to measure the second reception quality index value of the second pilot signal.

13. A mobile communication terminal as claimed in claim 2, wherein said distribution ratio setting section sets interference correction values for the first calculation processing result and the second calculation processing result in response to the first reception equality index value and the second reception quality index value, and said output section calculates values with which the calculation processing results corrected with the interference correction values are distributed based on the distribution ratio parameters.

14. A mobile communication terminal for CDMA communication wherein a pilot signal is used for phase correction of a reception signal, comprising:
a first pilot signal despreading section for despreading a first pilot signal spread with a spread code different from a spread code of a communication channel including a data signal;
a second pilot signal despreading section for despreading a second pilot signal inserted in the data signal and spread with the spread code for the data signal;
a first complex calculation section for performing complex calculation processing on a signal which despreading processing has been performed by said first pilot signal despreading section and outputting a result of the complex calculation processing as a first calculation processing result;
a second complex calculation section for performing complex calculation processing on a signal which despreading processing has been performed by said second pilot signal despreading section and outputting a result of the complex calculation processing as a second calculation processing result; and a correction amount output section for outputting a phase correction amount for a phase correction amount using the first calculation processing result and the second calculation processing result, wherein said correction amount output section includes:
a first reception quality measurement section for measuring a first reception quality index value of the first pilot signal using the first calculation processing result;
a second reception quality measurement section for measuring a second reception quality index value of the second pilot signal using the second calculation processing result;
a first phase correction amount calculation section for calculating a first phase correction amount for the reception signal using the first calculation processing result and outputting a first phase correction value;
a second phase correction amount calculation section for calculating a second phase correction amount for the reception signal using the second calculation processing result and outputting a second phase correction value;
a distribution ratio setting section for outputting distribution ratio parameters for the first phase correction value and the second phase correction value based on the first reception quality index value and the second reception quality index value; and
an output section for calculating values with which the first phase correction value and the second phase correction value are distributed based on the distribution ratio parameters from said distribution ratio setting section and outputting the first and second phase correction values based on upon the distribution ratio parameters as the phase correction amount.

15. A mobile communication terminal as claimed in claim 14, wherein said distribution ratio setting section sets the distribution ratio parameters such that, as the first reception quality index value deteriorates relative to the second reception quality index value, the distribution ratio of the second phase correction value increases relative to the distribution ratio of the first phase correction value.

16. A mobile communication terminal as claimed in claim 14, wherein said distribution ratio setting section sets the distribution ratio parameters such that, where the first reception quality index value is higher than the second reception quality index value, the first phase correction value from said first phase correction amount calculation section is outputted as the phase correction amount, but where the first reception quality index value is lower than the second reception quality index value, the second phase correction value from said second phase correction amount calculation section is outputted as the phase correction amount.

17. A mobile communication terminal as claimed in claim 16, wherein said distribution ratio setting section sets, for the second reception quality index value which is an object of discrimination in magnitude from the first reception quality index value, a comparison margin value corresponding to a kind of reception quality index value, and sets the distribution ratio parameters corresponding to the first reception quality index value and a value obtained by adding the comparison margin value to the second reception quality index value.

18. A mobile communication terminal as claimed in claim 14, wherein each of said first reception quality measurement section and said second reception quality measurement section measures a reception levels as the first and second reception quality index values.

19. A mobile communication terminal as claimed in claim 14, wherein each of said first reception quality measurement section and said second reception quality measurement section measures a signal to interference and noise power ratio or a signal to noise ratios as the first and second reception quality index values.

20. A mobile communication terminal as claimed in claim 14, wherein each of said first reception quality measurement section and said second reception quality measurement section calculates, as the first and second reception quality index values, a reception levels and a number of errors of a pattern of the pilot signal.

21. A mobile communication terminal as claimed in claim 14, wherein said distribution ratio setting section includes a reference table for storing distribution ratio parameters corresponding to a relationship between the first reception quality index value and the second reception quality index value and refers to said reference table based on the reception quality index values from said first reception quality measurement section and said second reception quality measurement section to control and output the distribution ratio parameters.

22. A mobile communication terminal as claimed in claim 14, wherein said second reception quality measurement section averages reception quality index value data measured within a predetermined interval to measure the second reception quality index value of the second pilot signal.

23. A mobile communication terminal as claimed in claim 14, wherein said distribution ratio setting section sets interference correction values for the first calculation processing result and the second calculation processing result in response to the first reception equality index value and the second reception quality index value, and said output section calculates values with which the calculation processing results corrected with the interference correction values are distributed based on the distribution ratio parameters.

* * * * *